United States Patent
Maruno et al.

(10) Patent No.: US 8,729,836 B2
(45) Date of Patent: May 20, 2014

(54) CONTROL DEVICE FOR HOIST AND CONTROL METHOD THEREOF

(75) Inventors: Masaharu Maruno, Fukuoka (JP); Daisuke Matsuo, Fukuoka (JP); Kazuho Furukawa, Yamanashi (JP)

(73) Assignee: Kito Corporation, Yamanashi (JP)

(*) Notice: Subject to any disclaimer, the term of this patent is extended or adjusted under 35 U.S.C. 154(b) by 213 days.

(21) Appl. No.: 13/498,302

(22) PCT Filed: Sep. 29, 2010

(86) PCT No.: PCT/JP2010/067492
§ 371 (c)(1),
(2), (4) Date: Mar. 26, 2012

(87) PCT Pub. No.: WO2011/040636
PCT Pub. Date: Apr. 7, 2011

(65) Prior Publication Data
US 2012/0185084 A1    Jul. 19, 2012

(30) Foreign Application Priority Data
Sep. 30, 2009  (JP) ................... 2009-228552

(51) Int. Cl.
*H02P 23/08*    (2006.01)

(52) U.S. Cl.
USPC ........... 318/258; 318/364; 318/365; 318/256; 318/280; 318/10; 318/282; 318/286; 318/466; 318/739; 318/281; 318/443

(58) Field of Classification Search
USPC ........... 318/258, 256, 280, 10, 739, 281, 443, 318/282, 286, 466, 364, 365
See application file for complete search history.

(56) References Cited

U.S. PATENT DOCUMENTS

| | | | | |
|---|---|---|---|---|
| 3,965,407 A | * | 6/1976 | Stoner | 318/432 |
| 4,078,190 A | * | 3/1978 | Nash | 318/799 |
| 4,078,191 A | * | 3/1978 | Morters et al. | 318/799 |

(Continued)

FOREIGN PATENT DOCUMENTS

| | | |
|---|---|---|
| JP | 59-124690 | 7/1984 |
| JP | 3-111397 | 5/1991 |
| JP | 5-319788 | 12/1993 |
| JP | 2001-151473 | 6/2001 |

OTHER PUBLICATIONS

International Search Report, dated Jan. 11, 2011, corresponding to PCT/JP2010/067492, 4 pages.

*Primary Examiner* — Rita Leykin
(74) *Attorney, Agent, or Firm* — Christie, Parker & Hale, LLP (57) ABSTRACT

A control device for a hoist, which enables easy judgment of the lifetime of a brake of a hoist is provided. The time setting unit sets the time from startup of a double winding induction motor to disengagement of the brake and the time from start of engagement of the brake to stopping of the double winding induction motor in accordance with the time from the startup of the double winding induction motor to generation of torque. The time changing unit detects if power-supply frequency of a power supply is 50 Hz or 60 Hz and can change at least one of the time from the startup of the double winding induction motor to the disengagement of the brake and the time from stopping of driving of the brake to stopping of double winding induction motor in accordance with the power-supply frequency of the power supply.

7 Claims, 5 Drawing Sheets

(56) References Cited

U.S. PATENT DOCUMENTS

| | | | |
|---|---|---|---|
| 4,093,898 A * | 6/1978 | Morters et al. | 318/740 |
| 4,509,004 A * | 4/1985 | Shepard, Jr. | 318/801 |
| 6,029,951 A * | 2/2000 | Guggari | 254/269 |
| 6,079,576 A * | 6/2000 | Bosler et al. | 212/278 |
| 6,527,130 B2 * | 3/2003 | Ruddy | 212/278 |
| 7,165,654 B2 * | 1/2007 | Takehara et al. | 187/290 |
| 7,354,028 B1 * | 4/2008 | Kacy | 254/267 |
| 7,681,748 B2 * | 3/2010 | Ueki et al. | 212/308 |

* cited by examiner

Fig.6

CONTROL DEVICE FOR HOIST AND CONTROL METHOD THEREOF

CROSS-REFERENCE TO RELATED APPLICATION

This application is a National Phase Patent Application and claims the priority of International Application Number PCT/JP2010/067492 filed on Sep. 29, 2010, which claims priority of Japanese Patent Application Number 2009-228552 filed on Sep. 30, 2009.

TECHNICAL FIELD

The present invention relates to a control device, which controls a hoist which has a double winding induction motor and a brake, and a control method therefore.

BACKGROUND ART

Conventionally, as a hoist which can be changed in the speed of lifting or lowering of a workpiece, a hoist which uses a double winding induction motor has been broadly used. In the hoist which uses the double winding induction motor, a switching among lifting at a high speed (high speed lifting), lowering at a high speed (high speed lowering), lifting at a low speed (low speed lifting), and lowering at a low speed (low speed lowering) is carried out by an operation of an operating unit (for example, Patent Documents 1 and 2).

PRIOR ART DOCUMENTS

Patent Documents

Patent Document 1: Japanese Unexamined Patent Publication (Kokai) No. 3-36197A
Patent Document 2: Japanese Patent Unexamined Publication (Kokai) No. 49-124515A

SUMMARY OF INVENTION

Problem to be Solved by the Invention

Power-supply frequency of a power supply which supplies power to the double winding induction motor is, depending on the country or region, either 50 Hz or 60 Hz. The number of rotations of the double winding induction motor (lifting or lowering speed) differs according to the power-supply frequency. That is, the number of rotations of the double winding induction motor when the power-supply frequency is 60 Hz becomes 1.2 times the number of rotations when the power-supply frequency is 50 Hz. Braking energy of a brake which is used for a hoist also differs according to the power-supply frequency, so the degree of wear of a brake disk of the brake which is used for the hoist also differs according to the power-supply frequency. As a result, the degree of wear of the brake disk of the brake which is used for the hoist varies according to the power-supply frequency and therefore judgment of the lifetime of the brake of the hoist becomes difficult.

In the hoist which uses the double winding induction motor, to facilitate management of the hoist, it is preferable to eliminate variation in the degree of wear of the brake disk of the brake which is used for the hoist and to facilitate judgment of the lifetime of the brake of the hoist.

An object of the present invention is to provide a control device a hoist, which enables easy judgment of the lifetime of the brake of the hoist, and a control method therefore.

Means for Solving the Problem

To solve the above problem, the present invention provides a control device for a hoist, wherein the control device has: the time setting unit which sets a time from startup of a double winding induction motor which performs lifting or lowering by a first speed or by a second speed which is lower than the first speed to disengagement of a brake which brakes the double winding induction motor and the time from start of engagement of the brake to stopping of the double winding induction motor in accordance with the time from the startup of the double winding induction motor to generation of torque; and a time changing unit which detects power-supply frequency of a power supply which supplies power to the hoist and can change at least one of the time from the startup of the double winding induction motor to the disengagement of the brake and the time from the start of engagement of the brake to the stopping of the double winding induction motor in accordance with the power-supply frequency of the power supply.

The control device for a hoist preferably further has an engagement time detection unit which detects an engagement time of the brake and a replacement timing judgment unit which judges a replacement timing of the brake based on the engagement time which is detected by the engagement time detection unit.

In the control device for a hoist, preferably the time setting unit sets the time from the startup of the double winding induction motor to the disengagement of the brake and the time from the start of engagement of the brake to the stopping of the double winding induction motor in a manner changeable by parameters.

The control device for a hoist preferably further has an induction motor instruction unit which instructs the double winding induction motor to stop after switching from the lifting or lowering at the first speed to the lifting or lowering at the second speed when the lifting or lowering at the first speed is performed.

The control device for a hoist preferably further has an induction motor instruction unit which instructs the double winding induction motor to switch from the lifting or lowering at the second speed after startup to the lifting or lowering at the first speed when the lifting or lowering at the first speed is performed.

Further, the present invention provides a method of controlling a hoist which has a double winding induction motor which performs lifting or lowering by a first speed or by a second speed which is lower than the first speed and a brake which brakes the double winding induction motor, the method comprising steps of: detecting power-supply frequency of a power supply which supplies power to the double winding induction motor; and changing at least one of the time from the startup of the double winding induction motor to disengagement of the brake, which is set in accordance with the time from the startup of the double winding induction motor to generation of torque and the time from the start of the double winding induction motor to stopping of the double winding induction motor, which is set in accordance with the time from the startup of the double winding induction motor to the generation of torque, in accordance with the power-supply frequency of the power supply.

According to the present invention, it is possible to easily judge the lifetime of a brake of a hoist device.

EMBODIMENTS FOR CARRYING OUT THE INVENTION

Embodiments of a control device and method for a hoist according to the present invention will be explained in detail while referring to the drawings.

Figure 1:
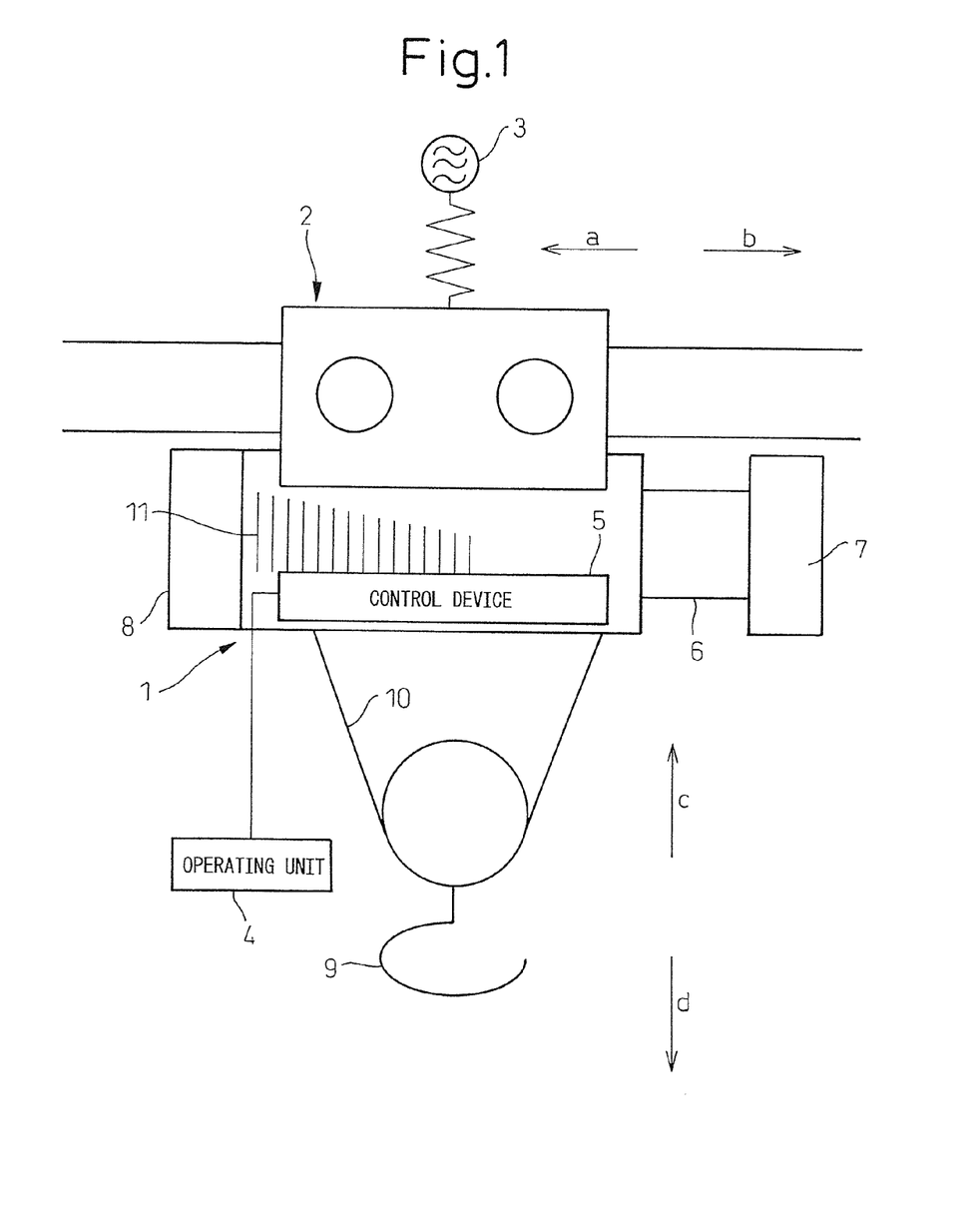
FIG. 1 is a schematic view of a hoist in which a control device for a hoist according to the present invention is used.

FIG. 1 is a schematic view of a hoist in which a control device for a hoist according to the present invention is used. In FIG. 1, a hoist 1 is attached to a hoist traverse mechanism 2 which can move in an arrow "a" or "b" direction and is supplied with power from a power supply 3 such as a three-phase power supply. Further, the hoist 1 is provided with a control device 5 which controls the various actuations of the hoist 1 in accordance with operation of an operating unit 4.

The hoist 1 has a double winding induction motor 6 which performs lifting in an arrow "c" direction or lowering (rotation) in an arrow "d" direction at a high speed as a first speed or a low speed as a second speed, a brake 7 which brakes the double winding induction motor 6, a speed reducer 8 to which amplifies torque which is generated in the double winding induction motor 6, a hook 9 to which a workpiece can be attached, a wire rope 10 which is connected to the hook, and a drum 11 which lifts or lowers the wire rope 10 by the speed reducer 8 which amplifies the torque.

Note that, the values of the high speed and low speed are, for example, set by the operating unit 4 in accordance with the workpiece which is attached to the hook 9. Further, the operating unit 4 switches among high speed lifting, high speed lowering, low speed lifting, and low speed lowering by using a 2-stage type of push button switch or a 4-button type of push button switch. When a 2-stage type of push button switch is used, a low speed lifting control signal is output if a first button thereof is pushed once, a high speed lifting control signal is output if the first button is pushed twice, a low speed lowering control signal is output if a second button thereof is pushed once, and a high speed lowering control signal is output if the second button is pushed twice. On the other hand, a 4-button type of push button switch is used, a low speed lifting control signal is output if a first button thereof is pushed once, a high speed lifting control signal is output if a second button thereof is pushed once, a low speed lowering control signal is output if a third button thereof is pushed once, and a high speed lowering control signal is output if a fourth button thereof is pushed once.

Figure 2:
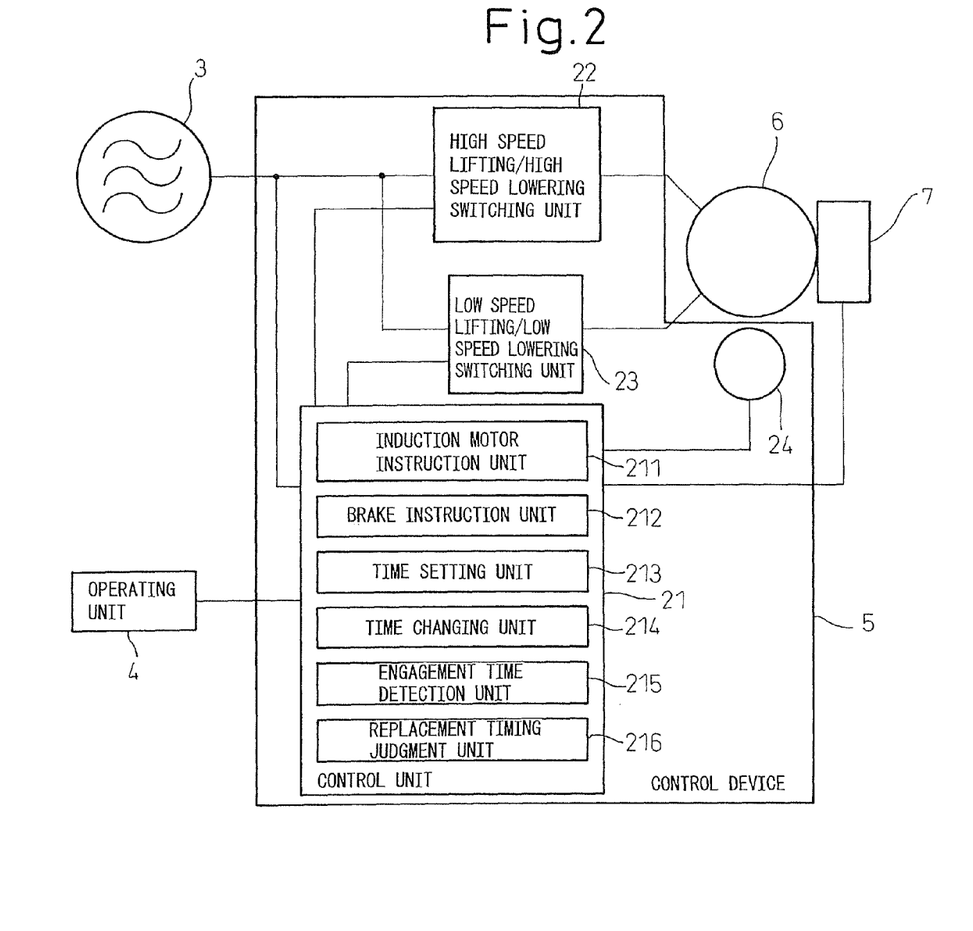
FIG. 2 is a block diagram of a control device for a hoist according to the present invention and its surrounding parts.

FIG. 2 is a block diagram of a control device for a hoist according to the present invention and its surrounding parts. In FIG. 2, the control device 5 has a control unit 21, a high speed lifting/high speed lowering switching unit 22, a low speed lifting/low speed lowering switching unit 23, and a rotation sensor 24.

The control unit 21 is comprised of a board embedding a microcomputer. Various programs which are stored in a memory (not shown) are run to control the activations of the double winding induction motor 6 and brake 7 in accordance with operation signals which are output from the operating unit 4. For this reason, the control unit 21 has an induction motor instruction unit 211, a brake instruction unit 212, a time setting unit 213, a time changing unit 214, an engagement time detection unit 215, and a replacement timing judgment unit 216.

The induction motor instruction unit 211 sends an instruction for high speed lifting, high speed lowering, low speed lifting, or low speed lowering through the high speed lifting/high speed lowering switching unit 22 and low speed lifting/low speed lowering switching unit 23 to the double winding induction motor 6 in accordance with operation signals from the operating unit 4. The brake instruction unit 212 sends an instruction for drive accompanying the lifting or lowering of the induction motor instruction unit 211 to the brake 7 in accordance with control signals from the control unit 4.

The time setting unit 213 sets the time from the startup of the double winding induction motor 6 to the disengagement of the brake 7 and the time from the start of engagement of the brake 7 to stopping of the double winding induction motor 6 in accordance with the time from the startup of the double winding induction motor 6 to generation of torque. The time changing unit 214 detects if the power-supply frequency of the power supply 3 is 50 Hz or 60 Hz and can change at least one of the time from the startup of the double winding induction motor 6 to the disengagement of the brake 7 and the time from the start of engagement of the brake 7 to the stopping of the double winding induction motor 6 in accordance with the power-supply frequency of the power supply 3.

The engagement time detection unit 215 detects the engagement time of the brake by comparing the number of rotations of the double winding induction motor 6 detected by the rotation sensor 24 during the time from the start of engagement of the brake 7 to the stopping of the double winding induction motor 6 with the actually measured data of the speed stored in the memory (not shown). The replacement timing judgment unit 216 judges the replacement timing of the brake pad of the brake 7 based on the engagement time detected by the engagement time detection unit 215.

The high speed lifting/high speed lowering switching unit 22 switches the double winding induction motor 6 to the high speed lifting or the high speed lowering in accordance with an instruction from the induction motor instruction unit 211. For this reason, the high speed lifting/high speed lowering switching unit 22 is comprised of a plurality of switches which are comprised of transistors etc. The low speed lifting/low speed lowering switching unit 23 switches the double winding induction motor 6 to the low speed lifting or the low speed lowering in accordance with an instruction from the induction motor instruction unit 211. For this reason, the low speed lifting/low speed lowering switching unit 23 is comprised of a plurality of switches which are comprised of transistors etc. The rotation sensor 24 detects the number of rotations of the double winding induction motor 6 for detecting the time from stopping of the drive of the brake 7 to the stopping of the double winding induction motor 6 and the time from the startup of the double winding induction motor 6 to the generation of torque.

FIGS. 3a to 3d are timing charts of the activation of a double winding induction motor and a brake of a hoist at the time of high speed lifting, at the time of high speed lowering, at the time of low speed lifting, and at the time of low speed lowering. FIGS. 3a to 3d show the relationship among the input of the operation signals, speed of the double winding induction motor 6, and on/off state of the drive engagement of the brake 7 at the time of high speed lifting, at the time of high speed lowering, at the time of low speed lifting, and at the time of low speed lowering.

Figure 3A:
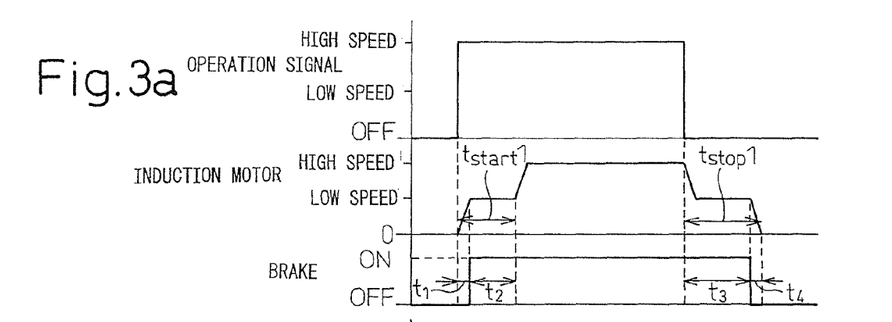
FIG. 3a is a timing chart of the actuation of a double winding induction motor and a brake of a hoist at the time of high speed lifting.

As shown in FIG. 3a, at the time of high speed lifting, the time t1 shows the time from the startup of the double winding induction motor 6 to the disengagement of the brake 7. The time t2 shows the time from the start of low speed rotation of the double winding induction motor 6 to switching to high speed rotation of the double winding induction motor 6. Therefore, the time tstart1 from the startup of the double winding induction motor 6 to the switching to the high speed lifting becomes the sum of the time t1 and the time t2. The time t3 shows the time from switching from high speed rotation of the double winding induction motor 6 to low speed rotation of the double winding induction motor 6 to the start of engagement of the brake 7. The time t4 shows the time from the start of engagement of the brake 7 to the stopping of the double winding induction motor 6. Therefore, the time tstop1 from the switching to low speed rotation of the double winding induction motor 6 to the stopping of the double winding induction motor 6 becomes the sum of the time t3 and the time t4.

The time t1 is set by the time setting unit 213 in accordance with the time from the startup of the double winding induction motor 6 by the induction motor instruction unit 211 in response to an operation signal from the operating unit 4 to the generation of torque. By setting the time t1 in this way, it is possible to consider the delay time of the circuits of the high speed lifting/high speed lowering switching unit 22 and the low speed lifting/low speed lowering switching unit 23. Further, the times t2 and t3 are set by the time setting unit 213 in accordance with an operation of the operating unit 4. The time t4 is set by the time setting unit 213 in accordance with the time from the startup of the double winding induction motor 6 by the induction motor instruction unit 211 in response to the operating signal from the operating unit 4 to the generation of torque. By setting the time t4 in this way, it is possible to eliminate the brake coasting time until the engagement of the brake 7 starts.

Figure 3B:
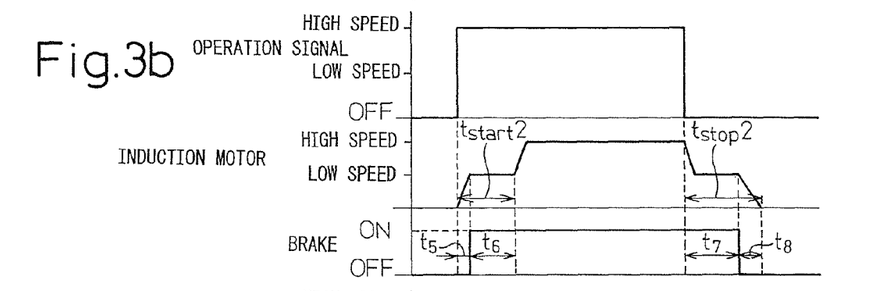
FIG. 3b is a timing chart of the actuation of a double winding induction motor and a brake of a hoist at the time of high speed lowering.

As shown in FIG. 3b, at the time of high speed lowering, the time t5 which expresses the time from the startup of the double winding induction motor 6 to the disengagement of the brake 7, the time t6 from the start of low speed rotation of the double winding induction motor 6 to the switching to high speed rotation of the double winding induction motor 6, the time t7 from the switching from high speed rotation of the double winding induction motor 6 to low speed rotation of the double winding induction motor 6 to the start of engagement of the brake 7, and the time t8 from the start of engagement of the brake 7 to the stopping of the double winding induction motor 6 are set in the same way as the times t1 to t4. Therefore, the time tstart2 from the startup of the double winding induction motor 6 to the switching to the lifting at a high speed becomes the sum of the time t5 and the time t6. The time tstop2 from the switching to low speed rotation of the double winding induction motor 6 to the stopping of the double winding induction motor 6 becomes the sum of the time t7 and the time t8.

Figure 3C:
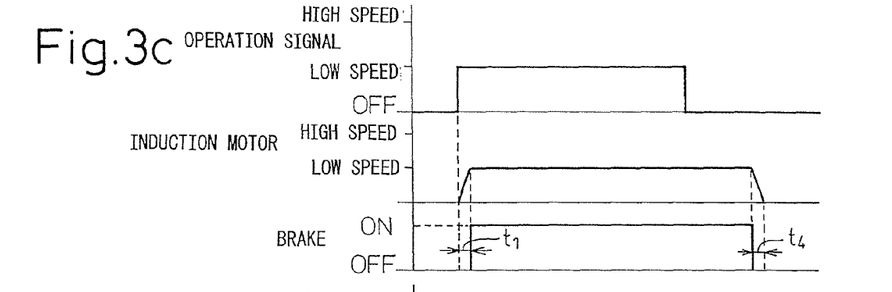
FIG. 3c is a timing chart of the actuation of a double winding induction motor and a brake of a hoist at the time of low speed lifting.
Figure 3D:
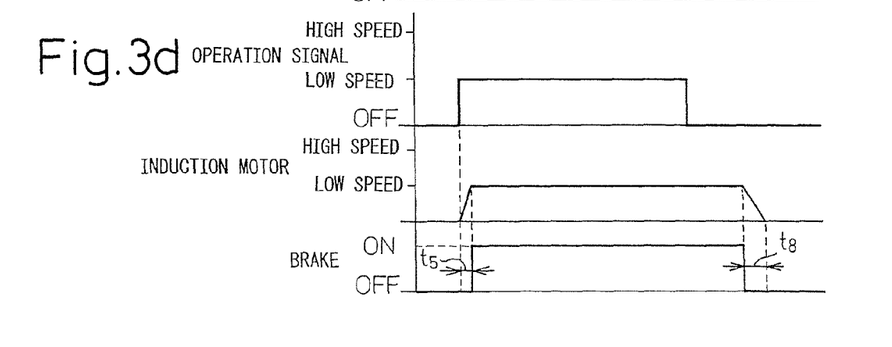
FIG. 3d is a timing chart of the actuation of a double winding induction motor and a brake of a hoist at the time of low speed lowering.

As shown in FIG. 3c, at the time of low speed lifting, the time from the startup of the double winding induction motor 6 to the disengagement of the brake 7 becomes t1, while the time from the start of engagement of the brake 7 to the stopping of the double winding induction motor 6 becomes t4. Further, as shown in FIG. 3d, at the time of low speed lowering, the time from the startup of the double winding induction motor 6 to the disengagement of the brake 7 becomes t5, while the time from the start of engagement of the brake 7 to the stopping of the double winding induction motor 6 becomes t8.

Figure 4:
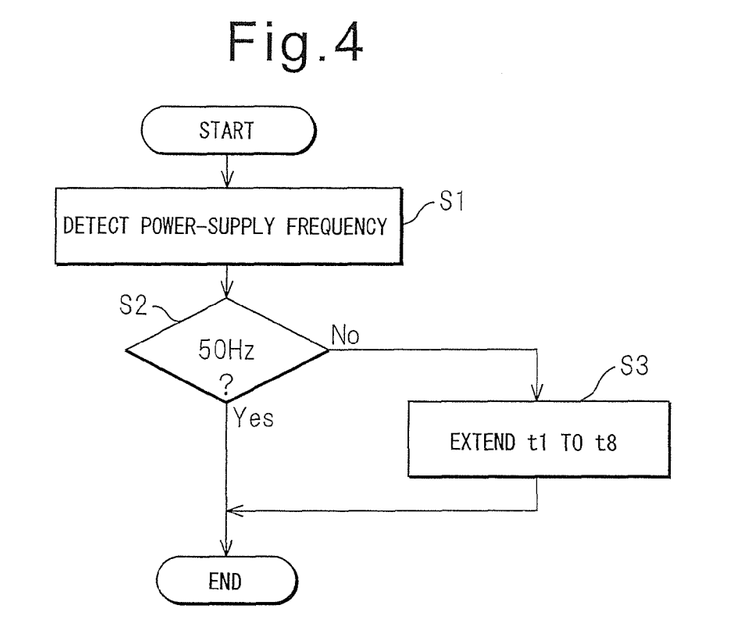
FIG. 4 is a flow chart of change of time which is executed by a control device for a hoist according to the present invention.

FIG. 4 is a flow chart of the change of time executed by a control device for a hoist according to the present invention. This flow is controlled by a program which is run by the control unit 21. The times t1 to t8 which are set when the power supply frequency is 50 Hz are made ones stored in advance in the memory (not shown).

First, at step S1, the time changing unit 214 detects the power-supply frequency of the power supply 3. Next, at step S2, the time changing unit 214 judges if the power-supply frequency is 50 Hz. If the power-supply frequency is 50 Hz, the present routine is ended. As opposed to this, if the power-supply frequency is not 50 Hz, that is, if the power supply frequency is 60 Hz, the time changing unit 214 extends the times t1 to t8 so that the braking energy of the brake 7 becomes the same as the braking energy at the time of a 50 Hz power-supply frequency. For example, it is possible to extend the times t1 to t8 to 1.2 times those at the time of a 50 Hz power-supply frequency.

At the time of stopping of the double winding induction motor 6, the number of rotations of the double winding induction motor 6 differs by the power-supply frequency, so the braking energy of the brake 7 also differs by the power-supply frequency. Therefore, the degree of wear of the brake disk of the brake 7 also differs by the power-supply frequency. According to the flow of FIG. 4, it is possible to make the braking energy of the brake 7 constant independently of the power-supply frequency by changing the times t1 to t8 in accordance with the power-supply frequency, so the degree of wear of the brake disk of the brake 7 no longer changes in accordance with the power-supply frequency. In this way, the degree of wear of the brake disk of the brake 7 does not change in accordance with the power-supply frequency, so a certain lifetime of the brake 7 can be secured without relation to the power-supply frequency, and the lifetime of the brake 7 can be easily judged.

Figure 5:
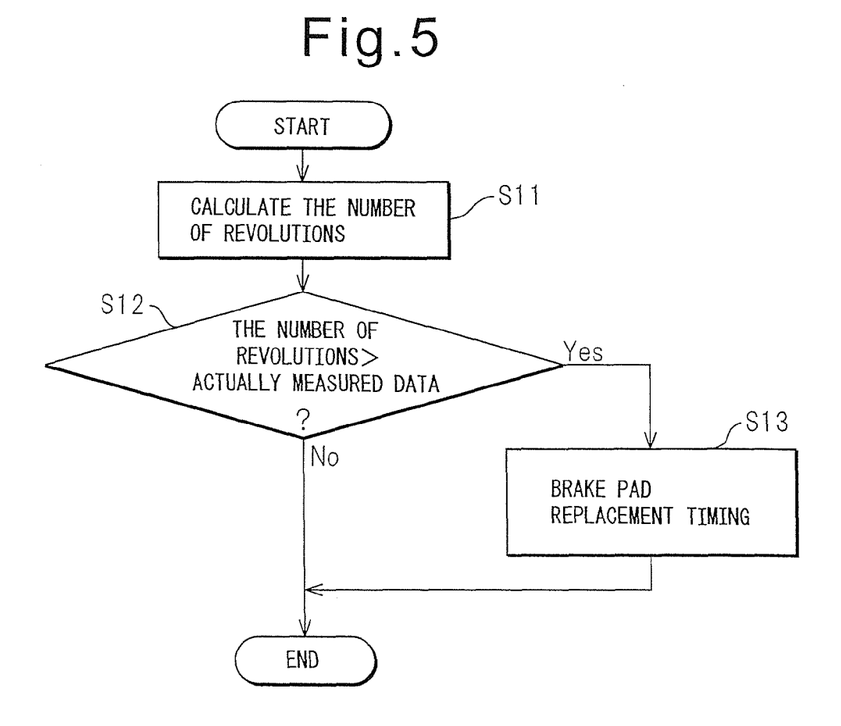
FIG. 5 is a flow chart of judgment of replacement timing which is executed by a control device for a hoist according to the present invention.

FIG. 5 is a flow chart of judgment of the replacement timing which is performed by a control device for a hoist according to the present invention. This flow is controlled by a program which is run by the control unit 21 and executed at the time of engagement of the brake 7.

First, at step S11, the engagement time detection unit 215 calculates the number of rotations of the double winding induction motor 6 detected by the speed sensor 24 during the time from the start of engagement of the brake 7 to the stopping of the double winding induction motor 6. Next, at step S12, the engagement time detection unit 215 judges if the calculated number of rotations is larger than the actually measured data. If the number of rotations is larger than the actually measured data, the replacement timing judgment unit 216 judges that it is a time to replace the brake pad of the brake 7, then the present routine is ended. As opposed to this, if the number of rotations is larger than the actually measured data, the present routine is ended as is. Note that, if the replacement timing judgment unit 216 judges that it is a time to replace the brake pad of the brake 7, the replacement timing judgment unit 216 displays the fact that it is a time to replace the brake pad of the brake 7 on the display unit provided on the board forming the control device 21.

If the brake disk of the brake 7 becomes worn, the engagement time of the brake 7 becomes longer, the double winding induction motor 6 cannot stop within the time t4 or t8, and slip occurs in the double winding induction motor 6. If slip occurs in the double winding induction motor 6, the stopping distance of the workpiece being lifted or lowered by the hoist 1 will change, so it is preferable to judge that the lifetime of the brake has ended when slip occurs. In the present routine, it is possible to learn that it is a time to replace the brake pad at the time of occurrence of slip, so it is possible to easily judge the lifetime of the brake.

The times t1 to t8 can be set in a changeable manner by the time charging unit 214 in accordance with an operation of buttons provided at the control device 5. The time changing unit 214 can set the times t1 and t5 in a changeable manner by parameters while considering the individual differences in circuits of the high speed lifting/high speed lowering switching unit 22 and the low speed lifting/low speed lowering switching unit 23 and differences due to a manufacturer. Further, the time changing unit 214 can set the times t2, t3, t6, and t7 in a changeable manner by parameters in accordance with the workability. For example, the time changing unit 214 can set the times t2, t3, t6, and t7 in a changeable manner by parameters so as to become longer when it is necessary to reduce the impact on the workpiece attached to the wire rope 10 and the hook 11 as much as possible (for example, when the workpiece is a precision equipment) and to become shorter when priority is given to user friendliness over impact on the workpiece attached to the wire rope 10 and the hook 11 (for example, when the workpiece is a steel frame). Furthermore, the time changing unit 214 can change t4 and t8 in a changeable manner by parameters so as to stop the double winding induction motor 6 at the time of start of engagement or before start of engagement of the brake 7 for reducing the braking energy of the brake 7 as much as possible. By setting the times t1 to t8 in a changeable manner by parameters, it is possible to control the lifetime of the brake, so it is possible to easily judge the lifetime of the brake.

Figure 6:
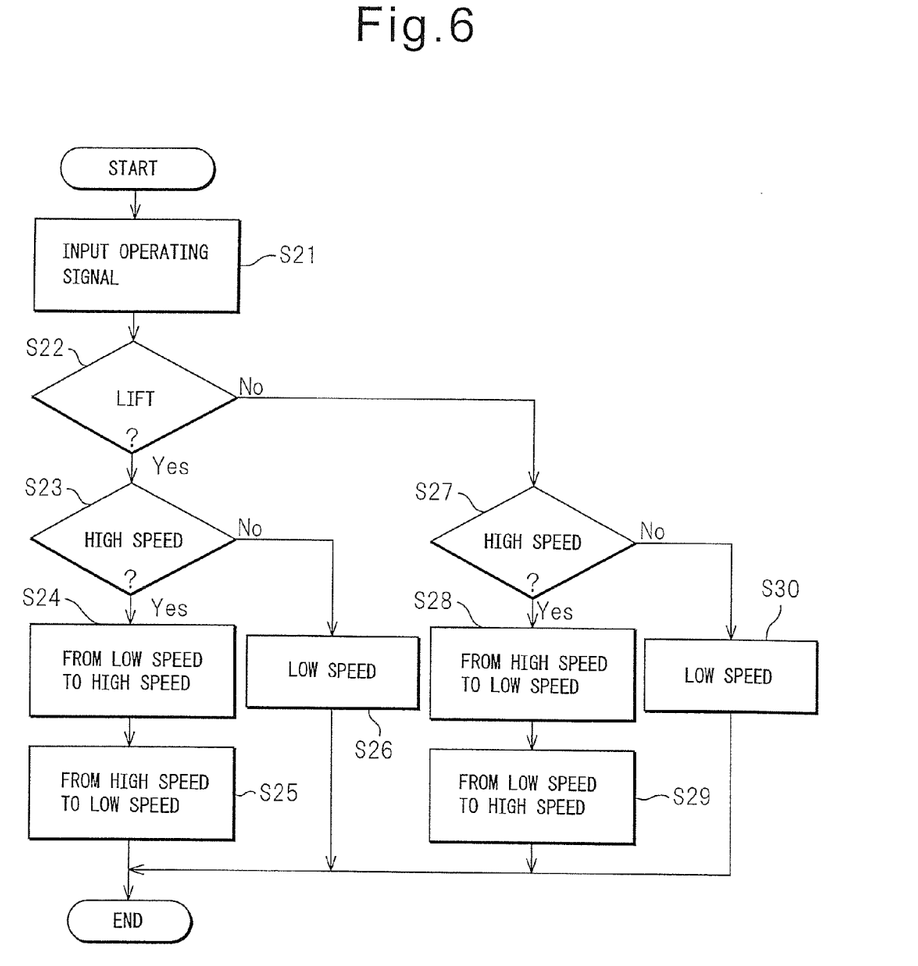
FIG. 6 is a flow chart of control of lifting and lowering which is executed by a control device for a hoist according to the present invention.

FIG. 6 is a flow chart of lifting and lowering control performed by a control device for a hoist according to the present invention. This flow is controlled by a program which is run by the control unit 21.

First, at step S21, an operation signal from the operating unit 4 is input to the induction motor instruction unit 211. After that, at step S22, the induction motor instruction unit 211 judges if a lifting command has been given based on the operation signal. When it is judged that a lifting command has been given, at step S23, the induction motor instruction unit 211 judges if a high speed lifting command has been given based on the operation signal. If it is judged that a high speed lifting command has been given, at step S24, the induction motor instruction unit 211 outputs a switching signal to the high speed lifting/lowering switching unit 22 and instructs the double winding induction motor 6 to switch from the low speed lifting to the high speed lifting after startup. Further, the brake instruction unit 212 instructs the brake 7 to disengage so as to make the double winding induction motor 6 startup. After that, at step S25, the induction motor instruction unit 211 instructs the double winding induction motor 6 to stop after switching from the high speed lifting to the low speed lifting. Further, the brake instruction unit 212 instructs the brake 7 to engage to cause the double winding induction motor 6 to stop. After that, the present routine is ended. On the other hand, if a high speed lifting command is not given, that is, when it is judged that a low speed lifting command has been given, at step S26, the induction motor instruction unit 211 outputs a switching signal to the low speed lifting/lowering switching unit 23 and instructs the double winding induction motor 6 to lift at a low speed. Further, the brake instruction unit 212 instructs the brake to release and engage so as to make the double winding induction motor 6 startup and stop. After that, the present routine is ended.

When it is judged that no lifting command is given, that is, when a lowering command is given, at step S27, the induction motor instruction unit 211 judges if a high speed lowering command has been given based on the operation signal. When a high speed lowering command is given, at step S28, the induction motor instruction unit 211 outputs a switching signal to the high speed lifting/lowering switching unit 22 and instructs the double winding induction motor 6 to switch from low speed lowering to high speed lowering after startup. Further, the brake instruction unit 212 instructs the brake 7 to be released so as to make the double winding induction motor 6 startup. After that, at step S29, the induction motor instruction unit 211 instructs the double winding induction motor 6 to stop after switching from high speed lowering to low speed lowering. Further, the brake instruction unit 212 instructs the brake 7 to engage so as to make the double winding induction motor 6 stop. After that, the present routine is ended. On the other hand, when it is judged that a high speed lowering command is not given, that is, a low speed lowering command is given, at step S30, the induction motor instruction unit 211 outputs a switching signal to the low speed lifting/lowering switching unit 23 and instructs the double winding induction motor 6 to perform the low speed lowering. Further, the brake instruction unit 212 instructs the brake 7 to disengage and engage so as to startup and stop the double winding induction motor 6.

In the present routine, at the time of the high speed lifting and the high speed lowering, the brake 7 is not engaged during the high speed lifting or the high speed lowering but engaged after switching from the high speed lifting or the high speed lowering to the low speed lifting or the low speed lowering. Therefore, the braking energy of the brake 7 in the present routine becomes the reciprocal of the square of the speed ratio compared with the case of engaging the brake 7 during the high speed lifting or the high speed lowering. For example, in the case of a speed ratio of 1:6, the braking energy can be reduced to 1/36. It is possible to greatly reduce the braking energy in this way, so the degree of wear of the brake disk of the brake 7 will not become remarkably large and the lifetime not become remarkably short and the lifetime of the brake can be easily judged. It is possible to greatly reduce the braking energy of the brake 7, so it is possible to reduce the dimension of the brake disk of the brake 7 compared with the case of engaging the brake during the high speed lifting or the high speed lowering. Further, by switching from the high speed lifting or the high speed lowering to the low speed lifting or the low speed lowering and then engaging the brake 7, it is possible to reduce the impact given to the wire rope 10 at the time of stopping the high speed lifting and the high speed lowering.

Further, in the present routine, at the time of the high speed lifting and the high speed lowering, the high speed lifting or the high speed lowering is not performed after the startup of the double winding induction motor 6. The low speed lifting or the low speed lowering is switched to the high speed lifting or the high speed lowering after the startup of the double winding induction motor 6. Therefore, it is possible to reduce the degree of wear of the brake disk of the brake 7 during the time from the startup of the double winding induction motor 6 to the disengagement of the brake 7, so the degree of wear of the brake disk of the brake 7 will not become remarkably large and the lifetime will not become remarkably short and it is possible to easily judge the lifetime of the brake. Further, the startup current of the double winding induction motor 6 becomes smaller compared with the case of performing the high speed lifting or the high speed lowering after the startup of the double winding induction motor 6. Furthermore, it is possible to reduce the impact given to the wire rope 10 at the time of start of the high speed lifting and the high speed lowering.

The present invention is not limited to the above embodiments. Various changes and modifications are possible. For example, the case of changing all of the times t1 to t8 in the processing routine of FIG. 4 in accordance with the power-supply frequency is explained, but it is also possible to change at least one of the times t1 to t8 in accordance with the power-supply frequency depending on the properties of the double winding induction motor 6 or the properties of the high speed lifting/high speed lowering switching unit 22 and low speed lifting/low speed lowering switching unit 23.

Further, the case where the replacement timing judgment unit 216 displays the fact that it is a time to replace the brake pad of the brake 7 on a display unit is explained, but it is also possible to provide a buzzer at the outside of the hoist 1 and to make the buzzer sound by the replacement timing judgment unit 216 to thereby inform the replacement timing of the brake pad.

The invention claimed is:

1. A control device for a hoist comprising:
   a time setting unit for setting the time from startup of a double winding induction motor performing lifting or lowering by a first speed or a second speed lower than said first speed to disengage a brake which brakes said double winding induction motor, and setting the time from start of engagement of said brake to stopping of said double winding induction motor, in accordance with the time from the startup of said double winding induction motor to a generation of a torque; and
   a time changing unit for detecting a power-supply frequency of a power supply supplying power to said hoist and capable of changing at least one of the time from the startup of said double winding induction motor to the disengagement of said brake and the time from the start of engagement of said brake to the stopping of said double winding induction motor, in accordance with the power-supply frequency of said power supply.

2. A control device for a hoist according to claim 1, further comprising:
   an engagement time detection unit for detecting an engagement time of said brake; and
   a replacement timing judgment unit for judging a replacement timing of the brake, based on the engagement time detected by said engagement time detection unit.

3. A control device for a hoist according to claim 1, wherein said time setting unit is configured to set the time from the startup of said double winding induction motor to the disengagement of said brake and the time from the start of engagement of said brake to the stopping of said double winding induction motor in a manner changeable by parameters.

4. A control device for a hoist according to claim 1, further comprising an induction motor instruction unit for instructing said double winding induction motor to stop after switching from the lifting or the lowering at said first speed to the lifting or the lowering at said second speed, when the lifting or the lowering at said first speed is performed.

5. A control device for a hoist according to claim 1, further comprising an induction motor instruction unit for instructing said double winding induction motor to switch from the lifting or the lowering at said second speed after the startup to the lifting or the lowering at said first speed, when the lifting or the lowering at said first speed is performed.

6. A method of controlling a hoist having a double winding induction motor which performs lifting or lowering by a first speed or by a second speed lower than said first speed, and a brake which brakes said double winding induction motor, said method comprising:
   detecting power-supply frequency of a power supply supplying power to said double winding induction motor; and
   changing at least one of the time from startup of the double winding induction motor to disengagement of the brake set in accordance with the time from the startup of said double winding induction motor to generation of torque, and the time from the startup of said double winding induction motor to stopping of said double winding induction motor set in accordance with the time from the startup of said double winding induction motor to the generation of torque, in accordance with the power-supply frequency of said power supply.

7. A control device for a hoist according to claim 2, wherein said time setting unit sets the time from the startup of said double winding induction motor to the disengagement of said brake and the time from the start of engagement of said brake to the stopping of said double winding induction motor in a manner changeable by parameters.

* * * * *

UNITED STATES PATENT AND TRADEMARK OFFICE
CERTIFICATE OF CORRECTION

| | |
|---|---|
| PATENT NO. | : 8,729,836 B2 |
| APPLICATION NO. | : 13/498302 |
| DATED | : May 20, 2014 |
| INVENTOR(S) | : Masaharu Maruno et al. |

It is certified that error appears in the above-identified patent and that said Letters Patent is hereby corrected as shown below:

In the Claims

Column 10, lines 31-32, Claim 6          Delete "supplysupplying",
                                         Insert --supply supplying--

Signed and Sealed this
Twenty-fifth Day of November, 2014

Michelle K. Lee
*Deputy Director of the United States Patent and Trademark Office*